US007121601B2

(12) United States Patent
Mulvihill et al.

(10) Patent No.: US 7,121,601 B2
(45) Date of Patent: Oct. 17, 2006

(54) INTEGRATED EXPANDABLE CARGO SYSTEM FOR VEHICLES

(75) Inventors: James A Mulvihill, Royal Oak, MI (US); Tracy Simpson, Ferndale, MI (US); Thomas Hicks, Livonia, MI (US); Douglas Kroll, Brighton, MI (US)

(73) Assignee: Lear Corporation, Southfield, MI (US)

( * ) Notice: Subject to any disclaimer, the term of this patent is extended or adjusted under 35 U.S.C. 154(b) by 50 days.

(21) Appl. No.: 10/710,685

(22) Filed: Jul. 28, 2004

(65) Prior Publication Data

US 2006/0022479 A1 Feb. 2, 2006

(51) Int. Cl.
*B60P 3/42* (2006.01)
*B60N 3/12* (2006.01)

(52) U.S. Cl. ............................. 296/24.33; 296/37.16

(58) Field of Classification Search ............ 296/24.33, 296/24.4, 37.16, 37.14, 37.1, 37.8
See application file for complete search history.

(56) References Cited

U.S. PATENT DOCUMENTS

| | | | |
|---|---|---|---|
| 4,884,733 A | 12/1989 | Geeves | |
| 4,892,210 A | 1/1990 | Kupersmit | |
| 5,025,964 A | 6/1991 | Phirippidis | |
| 5,054,668 A | 10/1991 | Ricchiuti | |
| 5,181,814 A | 1/1993 | Woods et al. | |
| 5,234,116 A | 8/1993 | Kristinsson et al. | |
| 5,366,189 A | 11/1994 | Thompson | |
| 5,392,972 A | 2/1995 | Caruso et al. | |
| 5,484,091 A | 1/1996 | Malinowski et al. | |
| 5,492,257 A | 2/1996 | Demick | |
| 5,520,316 A | 5/1996 | Chen | |
| 5,538,148 A | 7/1996 | Indyk | |
| 5,628,543 A * | 5/1997 | Filipovich et al. | 297/113 |
| 5,685,470 A * | 11/1997 | Moore | 224/567 |
| 5,713,502 A | 2/1998 | Dixon | |
| 5,924,611 A | 7/1999 | Mizuno | |
| 6,003,926 A * | 12/1999 | Labeur | 296/37.8 |
| 6,007,283 A * | 12/1999 | Labeur | 410/97 |
| 6,041,987 A | 3/2000 | Tickoo | |
| 6,056,177 A | 5/2000 | Schneider | |
| 6,092,704 A | 7/2000 | Baumeister | |
| 6,149,040 A | 11/2000 | Walker | |
| 6,183,177 B1 * | 2/2001 | Dahlgren | 410/100 |
| 6,206,224 B1 | 3/2001 | Potts et al. | |
| 6,290,277 B1 | 9/2001 | Spykerman et al. | |
| 6,375,055 B1 | 4/2002 | Spykerman et al. | |
| 6,502,731 B1 | 1/2003 | Gehring et al. | |
| 6,550,654 B1 | 4/2003 | Crago | |
| 6,616,389 B1 * | 9/2003 | Ament et al. | 410/118 |
| 6,749,241 B1 * | 6/2004 | Erlandsson et al. | 296/24.4 |
| 6,908,269 B1 * | 6/2005 | Youngs et al. | 410/100 |

(Continued)

*Primary Examiner*—Joseph D. Pape
(74) *Attorney, Agent, or Firm*—Bir Law, PLC; David S. Bir

(57) ABSTRACT

An integrated storage system for vehicles includes an expandable container secured to and extendable from a vertical panel of the vehicle to at least one predetermined position to accommodate cargo. The container is collapsible so that it is substantially flush with the vertical panel when not in use and may be made of fabric or netting, for example. A semi-rigid end panel with a handle may be secured to the container to facilitate deploying and stowing the container. Depending on the application, the container may be removable from the vehicle to transport cargo. The storage system may be integrated into various locations including a cargo area, behind a seat or seats, in a truck bed, or in the trunk of a vehicle, for example.

19 Claims, 2 Drawing Sheets

U.S. PATENT DOCUMENTS 6,942,270 B1 * 9/2005 Mulvihill .................. 296/37.16
2001/0040382 A1 * 11/2001 Nemoto ................... 296/37.14
2002/0145022 A1 10/2002 Nguyen et al.
2003/0090119 A1 5/2003 Bateman
2003/0178869 A1 9/2003 Adams
2004/0094984 A1 * 5/2004 Eguchi ..................... 296/37.1

* cited by examiner

INTEGRATED EXPANDABLE CARGO SYSTEM FOR VEHICLES

BACKGROUND OF INVENTION

1. Field of the Invention

The present invention relates to systems and methods for vehicle cargo storage.

2. Background Art

Consumers continue to prefer maximum flexibility in configuring a vehicle interior to accommodate a varying number of passengers in addition to cargo of different shapes and sizes. Reconfigurable seating options often provide for a significant increase in the area available to transport cargo when needed. However, cargo restraint or management systems are typically not provided for this reconfigurable space. Various types of OEM and after-market accessories have been developed for use in organizing and securing cargo. However, currently available cargo management, organization, and/or restraint systems, whether utilized in a reconfigurable passenger/cargo space or a dedicated cargo space such as a trunk or truck bed, may also occupy significant space when not in use, or may be removed from the vehicle so that they are not available when needed. In addition, such systems are often not aesthetically pleasing to consumers, particularly when not being used.

SUMMARY OF INVENTION

The present invention includes an integrated storage system for a vehicle having an expandable container secured to and extendable from a vertical panel of the vehicle to at least one predetermined position to accommodate cargo. The container is collapsible to be substantially flush with the vertical panel when not in use and is preferably substantially hidden from view.

Embodiments of the invention include a flexible container made of fabric or netting, for example, with a semi-rigid end panel having a handle to facilitate deploying and stowing the storage system. The fabric or netting may be secured to the end panel by one or more elastomeric cords. The end panel may also include one or more devices, such as tabs or hooks, to hold the container or receptacle open at one or more positions. For example, in one embodiment rotatable hooks engage an opposing vertical panel in the vehicle so that the container extends across the width of the vehicle. The rotatable hooks can be used for hanging cargo when the storage system is not deployed. Another embodiment includes devices disposed on a floor panel that engage the end panel to hold the container open in a selected one of a plurality of positions.

The present invention provides a number of advantages. For example, the present invention provides flexible, integrated cargo storage that is aesthetically pleasing and may be substantially hidden from view and out of the way when not in use. The storage system of the present invention can accommodate and secure varying types and sizes of cargo. In addition, the storage system may optionally be removable to facilitate loading and unloading of cargo from the vehicle.

The above advantages and other advantages and features of the present invention will be readily apparent from the following detailed description of the preferred embodiments when taken in connection with the accompanying drawings.

DETAILED DESCRIPTION

As those of ordinary skill in the art will understand, various features of the present invention as illustrated and described with reference to any one of the Figures may be combined with features illustrated in one or more other Figures to produce embodiments of the present invention that are not explicitly illustrated or described. The combinations of features illustrated provide representative embodiments for typical applications. However, various combinations and modifications of the features consistent with the teachings of the present invention may be desired for particular applications or implementations.

Figure 1:
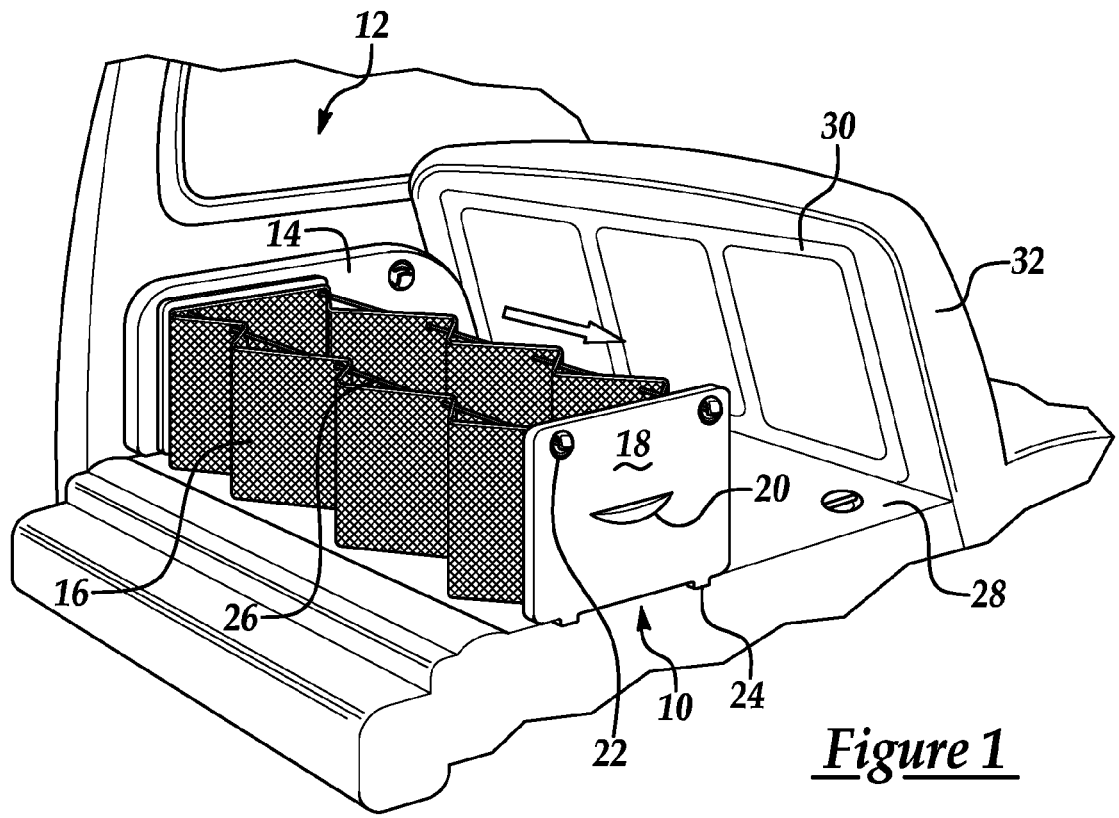
FIG. 1 is a partial cut-away view of a representative application for an integrated storage system in a deployed position according to one embodiment of the present invention.

Referring now to FIG. 1, a partial cut-away view of a representative application for an integrated storage system according to one embodiment of the present invention is shown. Storage system 10 is integrated with a vehicle interior, generally represented by reference numeral 12. As used throughout the description of the invention, a vehicle interior includes any area defined or contained by the outwardmost opposing vertical surfaces and does not require that the interior be enclosed by a roof or other cover. As such, the interior of a vehicle includes any passenger/cargo area covered by a permanent or retractable/convertible roof, as well as the trunk, or the bed of a truck, for example. Similarly, while the preferred embodiments of the invention are described with reference to an automobile, the present invention may be utilized in various other types of vehicles.

Storage system 10 includes a vertical trim panel 14 having an aperture or cavity disposed within interior 12 of the vehicle. A flexible cargo retaining element or container 16 includes a first end secured within the cavity of vertical trim panel 14 and a second end secured to an end panel 18. Depending upon the particular application and implementation, cargo retaining element 16 may be secured using any of a number of conventional permanent or temporary fastening methods. Permanent fastening methods may include rivets, screws, adhesives, etc. Temporary fastening methods may include the use of snaps, hook-and-loop closures, or zippers, for example. According to one embodiment of the present invention, cargo retaining element 16 is removably secured within the cavity and removably secured to the end panel to facilitate removal of the retaining element and any cargo from the vehicle. Alternatively, cargo retaining element 16 may be permanently secured to end panel 18 and a second end panel (not shown) with the second end panel removably secured within the cavity of vertical panel 14 to allow removal of storage system 10 from interior 12.

In the deployed position as illustrated in FIG. 1, cargo retaining element 16 extends from the cavity in trim panel 14 to end panel 18, which is preferably made of a semi-rigid material (similar or identical to that of vertical panel 14), to form a receptacle for receiving cargo. End panel 18 may include a handle 20 to facilitate deploying and stowing storage system 10. In addition, for embodiments that include a removable cargo retaining element, handle 20 facilitates removal of storage system 20 and any associated cargo. Handle 20 is preferably integrally formed in end panel 18. However, handle 20 may be a separate component that may be permanently or temporarily secured to end panel 18.

As also shown in FIG. 1, end panel 18 may include one or more devices 22, 24 for removably securing the end panel at a predetermined distance from vertical panel 14 when storage system 10 is deployed. In this embodiment, end panel 18 includes two hooks 22 and two tabs 24. Hooks 22 and tabs 24 may be integrally formed with end panel 18 or may be attached with appropriate fasteners. Hooks 22 may engage corresponding recesses in an opposing vertical panel (not shown) to maintain cargo retaining element 16 in an open position. Similarly, tabs 24 may engage a corresponding ridge or recess in an opposing vertical panel or in floor panel 28. Additional recesses or other devices may be positioned across the width of the vehicle to provide selective positions for securing end panel 18 as illustrated and described in greater detail with reference to FIGS. 4–5.

Figure 3:
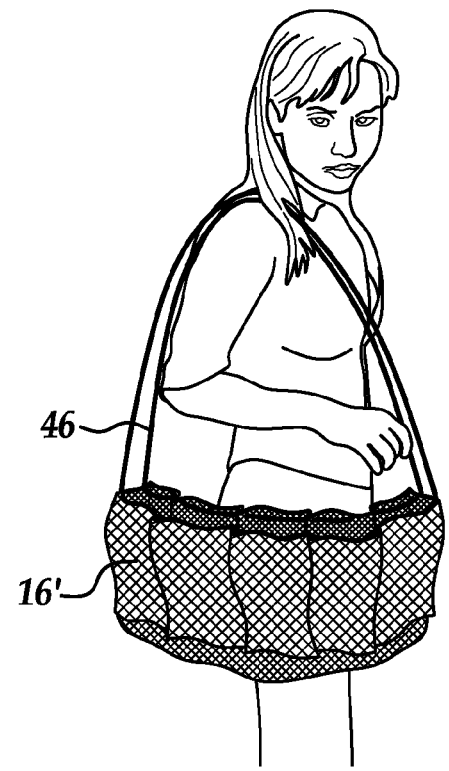
FIG. 3 is a perspective view illustrating an application for a removable storage system according to one embodiment of the present invention.
Figure 5:
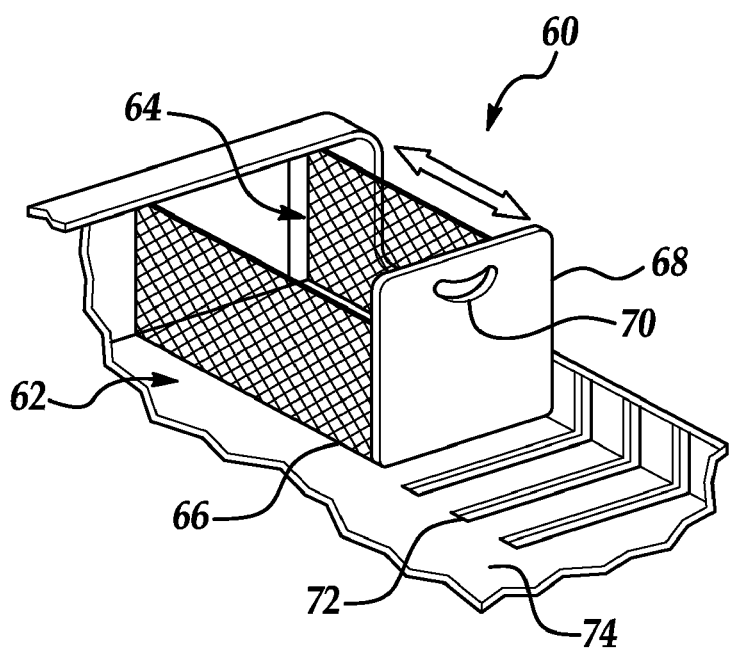
FIG. 5 is a partial cut-away view of an integrated trunk storage system according to one embodiment of the present invention.

Cargo retaining element 16 may be constructed from any suitable flexible material that provides an envelope or container for securing cargo, but is preferably made of a nylon, vinyl, canvas or similar fabric or netting as shown in the alternative embodiment of FIG. 5. As shown in FIG. 1, cargo retaining element 16 is supported by two elastomeric cords 26 that extend from the cavity in vertical panel 14 to end panel 18. The elasticity of cords 26 facilitate retracting cargo retaining element 16 into the stowed position. Alternatively, cargo retaining element 16 may incorporate elastic material to facilitate expanding and collapsing the cargo envelope created when the storage system is deployed and stowed, respectively. Of course, various alternative implementations for cargo retaining element 16 are possible in accordance with the present invention. For example, cargo retaining element 16 may include a closable flap with optional latch, snap, zipper, or hook-and-loop closure, etc. to completely cover any cargo for security or privacy purposes. In addition, a closable flap may be desired for applications in which cargo retaining element 16 is removable as illustrated in the embodiment of FIG. 3, for example, where cargo retaining element 16' may be attached to a handle or strap 46 to facilitate transportation of cargo outside of the vehicle.

As described above, those of ordinary skill in the art will appreciate that storage system 10 may be integrated into a lateral vertical trim panel 14 in addition to any other vertical panel such as a trim panel 30 of passenger seat 32. Other locations may include vehicle doors, seat cushions, trunk, or truck bed. Likewise, multiple storage systems of similar or varying sizes may be integrated into a single area of the vehicle or used throughout the vehicle depending on the particular application.

Figure 2:
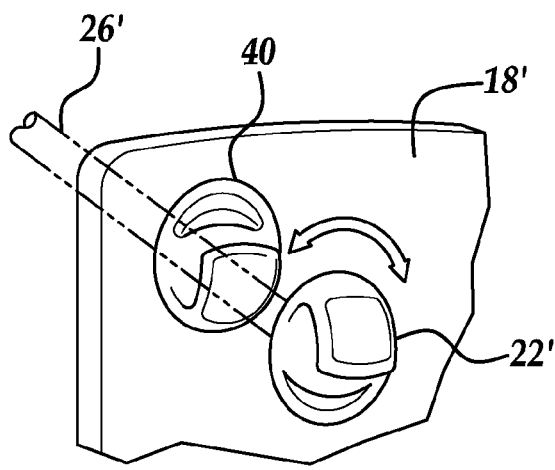
FIG. 2 is a perspective view of a rotatable latching/cargo hook for a storage system according to one embodiment of the present invention.

FIG. 2 illustrates a rotatable latching device to removably secure a storage system according to one embodiment of the present invention. As shown in FIG. 2, end panel 18' includes a rotatable latching device 22' that can be used to removable secure end panel 18' to an opposing trim panel, for example, to hold the associated cargo retaining element or container (not shown) in an open position. In one embodiment, hook 22' may be secured to elastomeric cord 26' within a socket or grommet of end panel 18' to resist rotation by the force exerted by elastomeric cord 26'. Hook 22' may be pulled out of socket 40 and rotated into position to engage a corresponding recess or loop on an opposing vertical panel, for example, when the storage system is deployed.

The force of cord 26' then returns hook 22' into the socket to maintain the desired rotational position. When the storage system is stowed, hook 22' may then be rotated into an upright position to function as a cargo storage hook. Alternatively, cord 26' and/or the cargo retaining element may be attached to end panel 18' independently of rotatable hook 22' so that hook 22' may be positioned at any location on the end panel and rotatably secured within socket 40.

Figure 4:
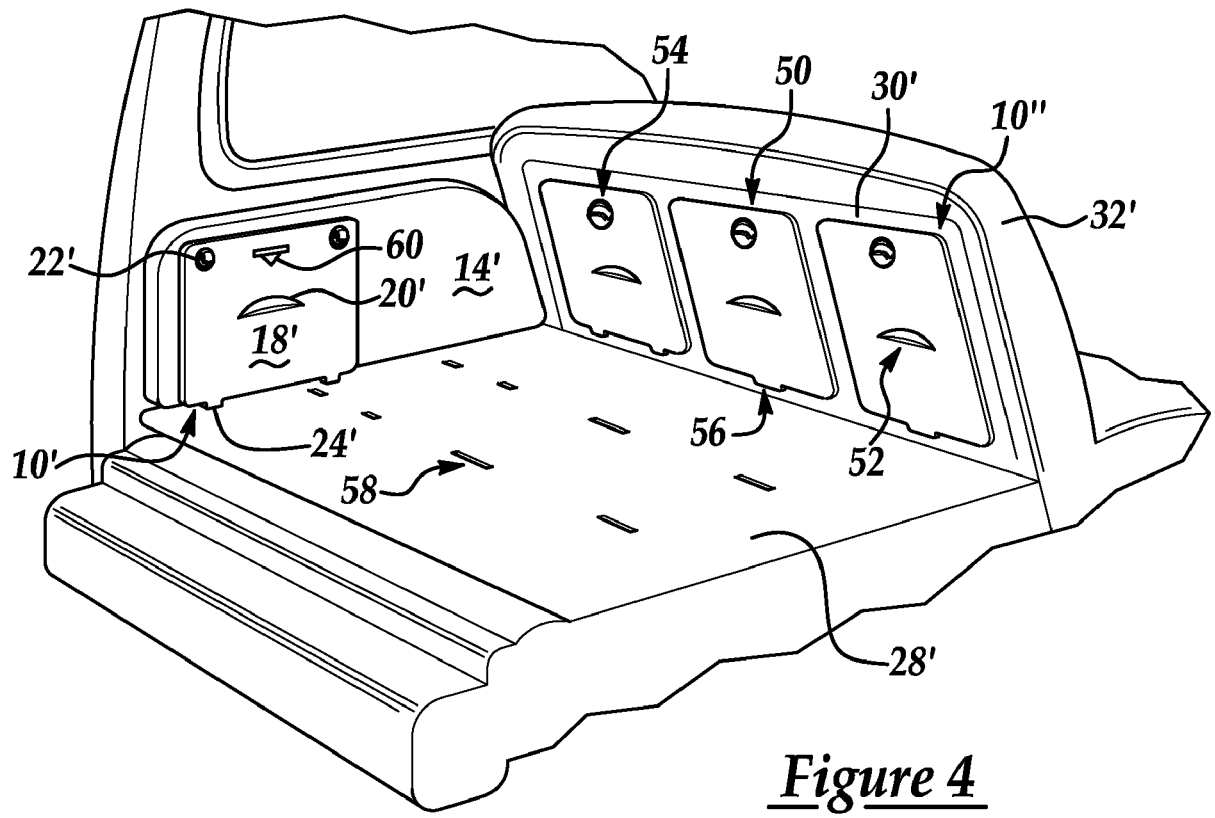
FIG. 4 is a partial cut-away view illustrating representative locations for an integrated storage system in a stowed position according to embodiments of the present invention.

FIG. 4 is a partial cut-away view illustrating representative locations for an integrated storage system in a stowed position according to embodiments of the present invention. As shown, in the stowed position, storage system 10' is substantially hidden from view and does not encumber the cargo area with the cargo retaining element contained within the cavity of vertical trim panel 14' and end panel 18' substantially flush with vertical panel 14' to provide an aesthetically pleasing appearance. Similar to the embodiment illustrated in FIG. 1, end panel 18' includes a handle 20' and devices 22', 24' to removably secure end panel 18' in an open (extended) or deployed position as described above with reference to FIG. 1. End panel 18' also includes a device 60 for securing a removable strap or handle 46 (FIG. 3).

Additional storage systems 10" are provided within vertical panel 30' attached to the back of passenger seat 32'. Each storage system 10" may include a corresponding handle 52 and one or more devices 54, 56 for removably securing each end panel 50 at one of a plurality of predetermined extended positions corresponding to recesses 58 in floor panel 28'. One or more tabs or similar devices 54 may engage corresponding recesses or grooves 58 at a selected position, and/or hook 54 may engage a corresponding recess or hook on a rear hatch or door, for example. As also shown in FIG. 4, each end panel 50 is preferably made of a similar material and color as vertical panel 30' and positioned substantially flush with surrounding vertical panel 30' to provide an aesthetically pleasing appearance with the associated flexible container or cargo retaining element substantially hidden from view within a corresponding cavity in vertical trim 30'.

FIG. 5 is a partial cut-away view of an integrated trunk storage system according to one embodiment of the present invention. Storage system 60 is positioned within a trunk space 62 of a vehicle and includes an expandable container 66 secured to and extendable from a vertical panel 64 to one of a number of predetermined positions 72 corresponding to devices such as recesses, grooves, ridges, etc. in floor panel 74 to accommodate cargo. Similar to the embodiments described above, container 66 is collapsible so that semi-rigid end panel 68 is substantially flush with vertical panel 64 and hidden from view when not in use. In this embodiment, flexible netting, preferably with some elasticity, is used for container 66 and is attached to end panel 68. A handle 70, preferably integrally formed in end panel 68, facilitates deploying and stowing of storage system 60. As with the previously described embodiments, storage system 60 may be removably secured to vertical panel 64 to facilitate removal and transportation of any cargo it contains outside of the vehicle.

As such, the present invention provides an aesthetically pleasing flexible, integrated cargo storage system that may be substantially hidden from view and out of the way when not in use. The storage system can accommodate and secure varying types and sizes of cargo and may optionally be removable to facilitate loading and unloading of cargo from the vehicle.

While the best mode for carrying out the invention has been described in detail, those familiar with the art to which this invention relates will recognize various alternative designs and embodiments for practicing the invention as defined by the following claims.

The invention claimed is:

1. A storage system for a vehicle, the system comprising:
   a vertical trim panel having a cavity;
   an end panel having a handle for deploying and stowing the storage system from the vertical trim panel;
   a flexible container having a first end secured within the cavity of the vertical trim panel and a second end secured to the end panel, the container extending from the cavity to the end panel to form a receptacle for receiving cargo when the end panel is deployed from the vertical trim panel, and collapsing into the cavity to be hidden from view when the end panel is stowed in the vertical trim panel.

2. The storage system of claim 1 wherein the container comprises a net.

3. The storage system of claim 1 wherein the container comprises fabric.

4. The storage system of claim 1 wherein the container is removably secured within the cavity and removably secured to the end panel to facilitate removal of the container and cargo within the container from the vehicle.

5. The storage system of claim 1 further comprising:
   elastomeric cords extending from the cavity to the end panel, wherein the container is supported from the elastomeric cords.

6. The storage system of claim 1 wherein the end panel includes at least one device for removably securing the end panel at a predetermined distance from the vertical trim panel when deployed.

7. The storage system of claim 6 further comprising:
   a floor panel having a plurality of recesses disposed at varying distances from the vertical trim panel, the recesses cooperating with the at least one device of the end panel to removably secure the end panel at a selected one of the distances.

8. The storage system of claim 6 wherein the at least one device comprises a rotatable hook.

9. The storage system of claim 1 wherein the vertical trim panel is secured to a rear portion of a passenger seat.

10. The storage system of claim 1 wherein the vertical trim panel is disposed within a trunk of the vehicle.

11. The storage system of claim 1 wherein the end panel fits substantially flush with the vertical trim panel when the storage system is stowed.

12. An integrated storage system for a vehicle, the storage system comprising:
    an expandable container having a semi-rigid end panel including netting secured thereto, the container extendable from a vertical panel of the vehicle to at least one predetermined position to accommodate cargo, the container being collapsible to be substantially flush with the vertical panel when not in use.

13. The storage system of claim 12 wherein the semi-rigid end panel includes a handle to facilitate expanding and collapsing of the container.

14. An integrated storage system for a vehicle, the storage system comprising:
    an expandable container having a semi-mid end panel extendable from a vertical panel of the vehicle to at least one predetermined position to accommodate cargo, the container being collapsible to be substantially flush with the vertical panel when not in use, wherein the end panel engages a device fixed to a floor panel at the at least one predetermined position to hold the container open.

15. An integrated storage system for a vehicle, the storage system comprising:
    an expandable container removably secured to and extendable from a vertical panel of the vehicle to accommodate cargo, the container being collapsible to be substantially flush with the vertical panel when not in use; and a strap associated with the container to facilitate transportation of cargo within the container outside the vehicle.

16. The storage system of claim 12 wherein the container is removably secured to the vertical panel of the vehicle so the container can be removed from the vehicle while maintaining contents within the container.

17. The storage system of claim 12 wherein the vertical panel is mounted to a back side of a passenger seat.

18. A storage system for a vehicle, the system comprising:
    a vertical trim panel having a cavity;
    an end panel having a rotatable hook for deploying and stowing the storage system from the vertical trim panel adapted to engage an opposing vertical trim panel and for hanging cargo;
    a flexible container secured within the cavity and to the end panel for receiving cargo when the end panel is deployed from the trim panel and collapsing into the cavity to be hidden from view when the end panel is stowed in the vertical trim panel; and
    a floor panel having at least one recess cooperating with the end panel to removably secure the end panel at a selected distance from the vertical trim panel to maintain the container in an open position.

19. The storage system of claim 18 wherein the vertical trim panel is permanently attached to a passenger seat.

* * * * *